United States Patent Office 3,533,942
Patented Oct. 13, 1970

3,533,942
PROCESS FOR LOADING EXPANDED WATER-SOLUTION HYDRATE SALT PARTICLES
Raymond C. Rhees, Whittier, and Howard N. Hammar, Los Alamitos, Calif., assignors to American Potash & Chemical Corporation, Los Angeles, Calif., a corporation of Delaware
No Drawing. Continuation-in-part of application Ser. No. 422,450, Dec. 30, 1964. This application Apr. 29, 1968, Ser. No. 725,123
Int. Cl. D06m
U.S. Cl. 252—8.8          7 Claims

ABSTRACT OF THE DISCLOSURE

A process for loading expanded, porous, water-soluble inorganic hydrate salt particles with at least one normally solid or normally gaseous additive and the product thereby produced. The expanded porous particles are loaded with the additive by contacting the particles with the additive while the additive is in a fluid state. The product comprises homogeneous, free-flowing water-soluble particles containing at least one additive, said particles being adapted for a number of uses such as, for example, detergents, water-softeners, dry cleaning agents and the like.

This application is a continuation-in-part of copending application Ser. No. 422,450, filed Dec. 30, 1964, now abandoned.

BACKGROUND OF THE INVENTION

Field of the invention

The present invention relates to loading puffed or expanded products with certain additives. More particularly, it relates to loading certain puffed or expanded water-soluble inorganic hydrate salt particles with solid or gaseous additives and relates further to the resulting free-flowing, homogeneous, particulate solid products.

Description of the prior art

Heretofore, a need has existed in industry for a low cost, water-soluble substance adapted for use as an adsorbent, absorbent, carrier or the like for various solid or gaseous additives. The detergent industry, for example, long has sought a substance which could be used as a carrier for additives which exist normally as solids or gases. Thus, there is a need in that industry for a particulate unitary product which will serve as a carrier for additives which are normally solids such as water softeners and additives which are normally gases such as perfumes and yet provide a solid particulate product which will dissolve quickly and rapidly in either hard or soft water used in both home and commercial laundries.

The dry cleaning industry has searched for a substance which could be loaded with organic drycleaning agents which are normally solids or gases and provide a free-flowing, dry to the touch particulate product suitable for use as a rug cleaner, spot cleaner or the like.

Certain chemical reactions require catalysts which are normally gases. The addition of a gaseous catalyst to a chemical reaction often is inconvenient; it often is more advantageous to add the catalyst in the form of a particulate solid. Thus, in such instances, a need exists for a carrier substance which can be loaded with hard-to-handle normally gaseous catalysts and still provide a solid particulate product adapted for convenient introduction into a chemical reaction medium.

It has been suggested heretofore to load solid additives onto porous, intumesced inorganic salt particles by mechanically mixing the dry, intumesced particles with dry, powdered additive. Such a loading technique suffers from the disadvantage, however, that the dry solid additive tends to separate from the intumesced particles so that it is extremely difficult to obtain a homogeneous product when such a dry mixing technique is employed. Therefore, there is a present need for an effective method of loading solid and gaseous additives onto expanded, porous, water-soluble inorganic hydrate salt particles.

SUMMARY OF THE INVENTION

The present invention provides a process for loading expanded, porous, water-soluble inorganic hydrate salt particles with a relatively wide variety of additive materials including additives which are normally solid and additives which are normally gaseous to provide a finished free-flowing product which is a particulate solid.

As used herein, the term "normal solids" refers to materials which are in a solid or semisolid state when placed in an open container at atmospheric pressure and at a temperature of about 20° C. The term "normal gases" refers to materials which are in a gaseous state or would rapidly become gaseous when placed in an open container at atmospheric pressure and at a temperature of about 20° C. Preferably such "normal gases" have a vapor pressure of at least about 60 mm. at 20° C.

In accordance with one aspect thereof, the present invention provides a process which comprises loading a mass of expanded porous water-soluble inorganic hydrate salt particles with at least one additive selected from the group consisting of normal solids and normal gases by contacting said particles with a predetermined quantity of said additive while the additive is in a fluid state.

The product so produced is dry-appearing, homogeneous and noncaking. It is water-soluble except for any additive portion which might be water-insoluble.

DESCRIPTION OF THE PREFERRED EMBODIMENTS

As indicated hereinabove, the carrier portion of the novel particulate product of this invention comprises expanded porous water-soluble inorganic hydrate salt particles. Such particles may be produced in various ways, one particularly preferred method being that disclosed in copending application Ser. No. 387,137, filed Aug. 3, 1964, entitled, "Process and Apparatus," and assigned to the same assignee as the present invention. According to said copending application, the expanded porous particles are prepared by introducing a stream of at least partially hydrated inorganic salts, in particulate form, into an expansion zone while separately and continuously supplying to said zone, at an independently controlled rate, a quantity of gas heated to a temperature sufficient to cause said salt particles to puff, expand, intumesce, or the like. If desired, a stream of cooling diluent gas also may be employed to prevent inadvertent overheating and to aid in conveying the expanded particles from the system. Said application also discloses apparatus in which the partially hydrated inorganic salts can conveniently be converted to their expanded porous state.

While it is preferred to use the apparatus disclosed in said copending application, it will be understood, of course, that other equipment may be used. It is essential that the puffing process be carried out in a manner such that the hydrate inorganic salt particles are heated rapidly to a temperature well above that at which the salt particles lose at least a part of their water of hydration. Rapid heating is required to produce a satisfactory puffed or expanded product. Thus, if the hydrated salt is heated slowly, it generally will lose at least a part, and in some instances all, of its water of hydration without undergoing the herein desired puffing or expansion.

This invention is applicable to a wide variety of hydrated inorganic salts. Particularly satisfactory results are obtained from common borax having the formula $$Na_2B_4O_7 \cdot 10H_2O$$

as well as sodium tetraborates having fewer moles of water. Examples of other satisfactory hydrated inorganic salts include the fully and partially hydrated compounds set forth in Table I below.

TABLE I

| Salt | Hydrated species |
|---|---|
| Aluminum sulfate | $Al_2(SO_4)_3 \cdot 18H_2O$ |
| Alum | $Al_2(SO_4)_3 \cdot (NH_4)_2SO_4 \cdot 24H_2O$ |
| Do | $Fe_2(SO_4)_3 \cdot (NH_4)_2SO_4 \cdot 24H_2O$ |
| Alum and other alums | $Al_2(SO_4)_3 \cdot K_2SO_4 \cdot 24H_2O$ |
| Ammonium borate | $NH_4HB_4O_7 \cdot 3H_2O$ |
| Ammonium ferrocyanide | $(NH_4)_4Fe(CN)_6 \cdot 6H_2O$ |
| Ammonium tungstate | $(NH_4)_2W_4O_{13} \cdot 8H_2O$ |
| Barium acetate | $Ba(C_2H_3O_2)_2 \cdot H_2O$ |
| Barium chloride | $BaCl_2 \cdot 2H_2O$ |
| Barium citrate | $Ba_3(C_6H_5O_7)_2 \cdot 7H_2O$ |
| Barium dichromate | $BaCr_2O_7 \cdot 2H_2O$ |
| Barium perchlorate | $Ba(ClO_4)_2 \cdot 3H_2O$ |
| Beryllium chloride | $BeCl_2 \cdot 4H_2O$ |
| Beryllium nitrate | $Be(NO_3)_2 \cdot 4H_2O$ |
| Beryllium sulfate | $BeSO_4 \cdot 4H_2O$ |
| Bismuth nitrate | $Bi(NO_3)_3 \cdot 5H_2O$ |
| Cadmium chloride | $CdCl_2 \cdot 2\frac{1}{2}H_2O$ |
| Cadmium permanganate | $Cd(MnO_4)_2 \cdot 6H_2O$ |
| Cadmium sulfate | $CdSO_4 \cdot H_2O$ |
| Calcium metaborate | $Ca(BO_2)_2 \cdot 2H_2O$ |
| Calcium chloride | $CaCl_2 \cdot 2H_2O$ |
| Calcium chromate | $CaCrO_4 \cdot 2H_2O$ |
| Calcium dithionate | $CaS_2O_6 \cdot 4H_2O$ |
| Chromic sulfate | $Cr_2(SO_4)_3 \cdot 18H_2O$ |
| Cobaltous bromide | $CoBr_2 \cdot 6H_2O$ |
| Cobaltous chloride | $CoCl_2 \cdot 6H_2O$ |
| Cupric chloride | $CuCl_2 \cdot 2H_2O$ |
| Cupric sulfate | $CuSO_4 \cdot 5H_2O$ |
| Ferric chloride | $FeCl_3 \cdot 6H_2O$ |
| Ferric sulfate | $Fe_2(SO_4)_3 \cdot 9H_2O$ |
| Ferrous chloride | $FeCl_2 \cdot 4H_2O$ |
| Ferrous sulfate | $FeSO_4 \cdot 5H_2O$ |
| Gadolinium chloride | $GdCl_3 \cdot 6H_2O$ |
| Gadolinium selenate | $Gd_2(SeO_4)_3 \cdot 8H_2O$ |
| Hydrazine perchlorate | $N_2H_5ClO_4 \cdot \frac{1}{2}H_2O$ |
| Iridiumtribromide | $IrBr_3 \cdot 4H_2O$ |
| Lanthanum bromide | $LaBr_3 \cdot 7H_2O$ |
| Lanthanum chloride | $LaCl_3 \cdot 7H_2O$ |
| Lithium tetraborate | $Li_2B_4O_7 \cdot 5H_2O$ |
| Lithium perchlorate | $LiClO_4 \cdot 3H_2O$ |
| Lithium sulfate | $LiSO_4 \cdot H_2O$ |
| Magnesium ammonium sulfate | $MgSO_4 \cdot (NH_4)_2SO_4 \cdot 6H_2O$ |
| Magnesium chromate | $MgCrO_4 \cdot 7H_2O$ |
| Magnesium perchlorate | $Mg(ClO_4)_2 \cdot 6H_2O$ |
| Magnesium selenate | $MgSeO_4 \cdot 6H_2O$ |
| Magnesium sulfate | $MgSO_4 \cdot 7H_2O$ |
| Manganese chloride | $MnCl_2 \cdot 4H_2O$ |
| Manganous sulfate | $MnSO_4 \cdot 4H_2O$ |
| Neodymium chloride | $NdCl_3 \cdot 6H_2O$ |
| Nickel bromide | $NiBr_2 \cdot 3H_2O$ |
| Nickel chloride | $NiCl_2 \cdot 6H_2O$ |
| Nickel silicofluoride | $NiSiF_6 \cdot 6H_2O$ |
| Nickel sulfate | $NiSO_4 \cdot 7H_2O$ |
| Palladium sulfate | $PdSO_4 \cdot 2H_2O$ |
| Phosphotomolybdic acid | $H_7P(Mo_2O_7)_6 \cdot 28H_2O$ |
| Platinic chloride | $PtCl_4 \cdot 8H_2O$ |
| Potassium aluminate | $K_2(AlO_2)_2 \cdot 3H_2O$ |
| Potassium arsenate | $K_2HAsO_4 \cdot H_2O$ |
| Potassium tetraborate | $K_2B_4O_7 \cdot 5H_2O$ |
| Potassium tetraborate tetrahydrate | $K_2B_4O_7 \cdot 4H_2O$ |
| Potassium carbonate | $K_2CO_3 \cdot 2H_2O$ |
| Potassium pyrophosphate | $K_4P_2O_7 \cdot 3H_2O$ |
| Potassium sodium carbonate | $KNaCO_3 \cdot 6H_2O$ |
| Potassium stannate | $K_2SnO_3 \cdot 3H_2O$ |
| Potassium tungstate | $K_2W_4O_{13} \cdot 8H_2O$ |
| Praseodymium chloride | $PrCl_3 \cdot 7H_2O$ |
| Praseodymium sulfate | $Pr_2(SO_4)_3 \cdot 8H_2O$ |
| Rhodium sulfate | $Rh_2(SO_4)_3 \cdot 12H_2O$ |
| Samarium chloride | $SmCl_3 \cdot 6H_2O$ |
| Sodium arsenate | $Na_3AsO_4 \cdot 12H_2O$ |
| Sodium metaborate | $Na_2B_2O_4 \cdot 4H_2O$ |
| Sodium metaborate octahydrate | $Na_2B_2O_4 \cdot 8H_2O$ |
| Sodium carbonate | $Na_2CO_3 \cdot 7H_2O$ |
| Sodium carbonate monohydrate | $Na_2CO_3 \cdot H_2O$ |

TABLE—Continued

| Salt | Hydrated species |
|---|---|
| Sodium ferrocyanide | $Na_4Fe(CN)_6 \cdot 10H_2O$ |
| Sodium sulfate | $Na_2SO_4 \cdot 7H_2O$ |
| Sodium sulfate decahydrate | $Na_2SO_4 \cdot 10H_2O$ |
| Sodium tungstate | $Na_2WO_4 \cdot 2H_2O$ |
| Sodium vanadate | $Na_3VO_4 \cdot 16H_2O$ |
| Stannic chloride | $SnCl_4 \cdot 5H_2O$ |
| Stannic sulfate | $Sn(SO_4)_2 \cdot 2H_2O$ |
| Strontium bromide | $SrBr_2 \cdot 6H_2O$ |
| Strontium chloride | $SrCl_2 \cdot 6H_2O$ |
| Tetrasodium pyrophosphate decahydrate | $Na_4P_2O_7 \cdot 10H_2O$ |
| Uranous sulfate | $U(SO_4)_2 \cdot 4H_2O$ |
| Vanadium flouride | $VF_3 \cdot 3H_2O$ |
| Vanadyl sulfate | $V_2O_4(SO_3)_3 \cdot 16H_2O$ |
| Yttrium bromide | $YBr_3 \cdot 9H_2O$ |
| Yttrium chloride | $YCl_3 \cdot 6H_2O$ |
| Zinc sulfate | $ZnSO_4 \cdot 7H_2O$ |
| Zirconium sulfate | $Zr(SO_4)_2 \cdot 4H_2O$ |

As noted hereinabove, particularly satisfactory results are obtained when sodium tetraborate is used as the water-soluble inorganic salt in the process of this invention. This material is generally preferred for use as the carrier in the present invention for it may be expanded under controlled conditions to provide a material of controlled bulk density and water content. Thus, expanded sodium tetraborate may be provided having a bulk density ranging from about two to about fifty pounds per cubic foot. Such expanded sodium tetraborate is substantially instantaneously soluble in water and has good resistance to physical breakdown despite its low density. It will be understood, however, that the present invention is not limited to the use of sodium tetraborates as the porous expanded particles, for the other inorganic hydrate salts set forth above may also be expanded and used in this invention.

The porous expanded inorganic hydrate salt particles can be loaded with large quantities of normally solid or normally gaseous additives due to its high void volume and pore size distribution. Usually, the amount of additive which may be loaded onto the porous, expanded particles increases as the bulk density of the particles decreases. Generally, the porous expanded particles may be loaded with up to about two-thirds of their volume with a normally solid additive material and with up to about 70 vapor volumes of a normally gaseous additive.

The porous, expanded, water-soluble inorganic hydrate salt particles may be loaded with a large number of normally solid and gaseous additives, as will be discussed in more detail hereinbelow. Generally, any normally solid or normally gaseous additive may be loaded onto the porous, expanded particles as long as the solubility of the particles is low in the additive applied thereto and no undesirable reaction occurs between the porous, expanded particles and the additive. The additive does not have to be completely anhydrous to be suitable for use in the present invention as long as the amount of water contained in the additive does not exceed the amount of water required for solution of the porous expanded particles.

The additive may be loaded onto the expanded particles in a variety of ways. Generally, any method which provides intimate contact between the porous, expanded particles and the additive may be used in this invention to provide a homogeneous, free-flowing, non-caking product. The additive must have sufficient fluidity for good dispersion so that upon contact with the porous, expanded particles, the additive is substantially uniformly dispersed throughout the mass of particles.

Thus, the expanded porous water-soluble inorganic hydrate salt particles may be loaded in a number of ways with additive materials which normally are gaseous. For example, the particles can be contacted with the gaseous additive by passing the gas through a quantity of the particles in a fluidized bed apparatus or while the particles are positioned on a static or moving screen device. In some instances, when operating in this fashion, particularly satisfactory results are obtained by initially evacuating substantially all air from the contacting apparatus. Alternatively, loading can be effected by cooling the gas to its liquid state and then allowing it to vaporize in the presence of the particles.

Examples of normally gaseous additive materials which are suitable for loading onto the expanded porous water-soluble inorganic hydrate salt particles in accordance with this invention include those materials set forth below:

| | |
|---|---|
| Trichloroethylene | Fluorodichloromethane |
| Boron trichloride | Methylcyclopropane |
| Phosgene | Methylhypochlorite |
| Chlorine monochloride | Methylmercaptan |
| Chlorine dioxide | Propylfluoride |
| Hydrogen telluride | Vinyl chloride |
| Nitrogen trioxide | Acetonitrile |
| Silicon bromohydride | Acrylonitrile |
| Sulfur dioxide | Carbon tetrachloride |
| Tungsten fluoride | Trichloromethyl silane |
| Bromoacetylene | Ethyl iodide |
| Butadiene | 1-bromopropane |
| Isobutylfluoride | Propylamine |
| Cyanogen chloride | Benzene |
| Cyclobutane | Cyclohexane |
| Diacetylene | Dimethylpentane |
| Difluorodichloroethylene | Perfumes |

Such normally gaseous additives are either in a gaseous state or would rapidly become gaseous when placed in an open container at atmospheric pressure and a temperature of about 20° C. and therefore are suitable for use in the present invention.

If desired, normally gaseous materials may be incorporated with the particles singly or in suitable admixtures of two or more. If more than one normally gaseous additive is to be incorporated with the particles, it is generally preferred to premix said additives prior to contacting them with the particles.

In most applications, this invention contemplates loading the particles with gases to provide a commercially saleable, particulate, free-flowing product. In accordance with another aspect, however, the invention also provides a convenient means for disposing of unwanted gases, generated both commercially or otherwise. For example, in certain manufacturing operations, contaminating gases may be evolved into the atmosphere. Utilizing the present invention, such unwanted gases may be associated with the particles after which the gas-loaded particles can be disposed of conveniently through an aqueous sewage system, since the particles are water-soluble.

As discussed hereinabove, the expanded porous water-soluble inorganic hydrate salt particles may be loaded with additive materials which are normally solid or semisolid. However, in order to substantially uniformly disperse the additive throughout the mass of porous expanded particles and prevent separation of the solid additive from the particles, such normally solid or semisolid additives must be in a liquid state when contacted with the porous expanded particles according to the process of this invention. The normally solid or semisolid additives may be converted to a liquid state in a number of ways.

Thus, the normally solid or semisolid additive may be heated to a temperature above its melting point (or its cloud point) to liquefy the material. The liquefied material thus obtained may be loaded onto the porous, expanded particles in any suitable manner which provides intimate contact with the particles. Direct addition of the liquefied material to the porous expanded particles, as by spraying, pouring, atomizing, or the like are generally preferred. During the addition, the particles preferably are continuously stirred or tumbled. According to a preferred embodiment, the expanded porous particles are heated prior to the application thereto of the liquefied additive.

The normally solid additive may also be converted to a liquid state by dissolving the solid in an inert volatile solvent to provide a solution of the additive in said solvent. The solution may then be applied to the porous, expanded particles in the same manner as described above with respect to the addition of normally solid additives. The volatile, inert solvent may subsequently be removed from the particles by any suitable techniques. Suitable solvents which may be used include volatile alcohols such as methyl alcohol, ethyl alcohol, 1-propyl alcohol and the like; ethers such as methyl ether, ethyl ether, dimethyl ether, diethyl ether and the like; ketones such as acetone, methyl ethyl ketone and the like; and mixtures thereof.

Examples of additives which normally are solids or semisolids and which are suitable for loading onto the porous, expanded particles include the materials set forth below:

Pentachlorophenol
Sodium pentachlorophenol
Sodium hexametaphosphate
Sodium tripolyphosphate
Di(hydrogenated tallow) dimethyl ammonium chloride
Primary tallow amines
Sodium-2-ethylhexyl polyphosphate
Sodium cypryl polyphosphate
Lauric alkylolamide
Sodium xylene sulfonate
Ammonium xylene sulfonate
Sodium lauryl sulfate
Lauryl dimethyl benzyl ammonium chloride
Lecithin
N-coco amino butyric acid
Resorcinol
Pyrogallol
Hydroquinone
Methyl carbamate
Acetamide
Benzenesulfonic acid
Diethylthiourea
Fluoroscein
Ethylpalmitate
Stearylchloride
Ethyldisulfide
Benzidine sulfonic disulfonic acid
Naphthotriazolylstilbene sulfonic acid
Bistriazinyl derivatives of 4,4'-diaminostilbene-2,2'-disulfonic acid The amount of normally solid or normally gaseous additive to be contacted with the porous, expanded particles during the loading of the particles may be varied widely and depends on such considerations as the intended use of the loaded particles, the porosity of the particles and the like. Generally, the porous, expanded particles are contacted with the additive for a period of time sufficient to load the particles with up to about two-thirds their volume with the normally solid additive and with up to 70 vapor volumes of a normally gaseous additive.

The following examples are set forth to illustrate, not to limit, the invention, whereby those skilled in the art may understand more fully the manner in which the present invention can be carried into effect. In the instant specification and appended claims, all parts and percentages are by weight unless otherwise indicated.

EXAMPLE I

To illustrate the loading of porous expanded water-soluble inorganic hydrate salt particles with normally gaseous additives, a quantity of particles of $Na_2B_4O_7 \cdot 5H_2O$ and having a size of $-20+100$ (U.S. Standard sieve) was divided into six portions or samples. Five of the portions then were puffed separately in accordance with the procedure disclosed in said copending application Ser. No. 387,137, now Pat. 3,454,357 utilizing the puffing gun or apparatus described therein. Specifically, the samples were introduced separately into a moving, heated gas stream in an expansion zone and puffed or expanded. The particle feed rate and the temperature of the heated gas stream were varied with each sample to yield expanded products having different puffing factors and densities, as shown below in Table II. Sample 6, which was not puffed or expanded, served as the control sample.

TABLE II

| | Puffer conditions | | | Product | | | | |
|---|---|---|---|---|---|---|---|---|
| | | Temp., °C. | | Moles $H_2O$ per Mole $Na_2B_4O_7$ | Bulk Density (lbs./cu. ft.) | | Particle size | Puffing factor |
| Sample No. | Feed rate, lbs./hr. | At feed point | At end of expansion chamber | | Poured | Tapped | | |
| 1 | 21.3 | 620 | 370 | 1.9 | 4.07 | 5.03 | −20+40 | 13.2 |
| 2 | 16.3 | 520 | 260 | 2.8 | 10.5 | 13.4 | −20+60 | 4.9 |
| 3 | 15.7 | 365 | 190 | 4.2 | 48.4 | 56.6 | −20+100 | 1.2 |
| 4 | 2.6 | 600 | 370 | 1.7 | 3.05 | 3.60 | −20+40 | 18.4 |
| 5 | 9.7 | 420 | 220 | 3.4 | 20.7 | 24.7 | −20+80 | 2.7 |
| 6 | | | | 4.8 | 56.8 | 64.8 | −20+100 | 1.0 |

The term "puffing factor" as used herein represents the expansion in volume of the inorganic hydrate salt compared to its original volume. The factor is obtained by dividing the final particle volume by the original particle volume.

Each of the five samples of the expanded or puffed porous particles then was loaded with gaseous trichloroethylene in the following manner. Quantities of each of the five samples were introduced into five separate standard weighing bottles (having a 30-millimeter diameter) to a depth of about 40 millimeters. The bottles were weighed and then placed, uncapped, in an empty desiccator fitted with a vacuum take-off and an addition funnel. The desiccator was evacuated rapidly to 20 millimeters mercury pressure after which trichloroethylene was introduced into it, care being exercised to avoid the admission of any air to the desiccator. Additional vacuum then was applied for a short period of time to cause the trichloroethylene to boil briefly. The samples were left undisturbed in the desiccator at the solvent vapor pressure (70 millimeters mercury) for about two hours. Air then was admitted slowly through a cotton wad saturated with trichloroethylene until atmospheric pressure was obtained. The bottles then were capped and reweighed. The results of this test, as set forth in Table III below, illustrate the nature of the fine pore structure of the expanded or puffed sodium tetraborate, with the volume of trichloroethylene loaded on the puffed particles increasing as the voids in the puffed particles increase. As shown in Table III, more than 30 vapor volumes of trichloroethylene were absorbed on each volume of the puffed particles.

TABLE III

| Sample No. | Puffing factor | Bulk density (lbs./cu. ft.) tapped | Specific volume (cc./gr.) tapped | Absorbed trichloroethylene (gr./gr.) puffed borax | Vapor volume (cc.) of trichloroethylene absorbed per gr. puffed borax |
|---|---|---|---|---|---|
| 1 | 13.2 | 5.03 | 12.4 | 3.19 | 544 |
| 2 | 4.9 | 13.4 | 4.66 | 1.18 | 201 |
| 3 | 1.2 | 56.6 | 1.10 | 0.18 | 31 |
| 4 | 18.4 | 3.05 | 20.5 | 4.71 | 803 |
| 5 | 2.7 | 27.5 | 2.27 | 0.44 | 75 |

This example illustrates one effective method of loading a normally gaseous additive onto expanded porous particles.

Other additives having a vapor pressure at least as great as trichloroethylene at similar temperatures may also be loaded onto expanded porous particles according to the procedure set forth in Example I. Such other materials include, for example, acetonitrile, acrylonitrile, trichloromethyl silane, ethyl iodide, propyl amine, dimethylpentane, 1-bromopropane, carbon tetrachloride, cyclohexane, benzene and the like.

The following examples illustrate the loading of porous, expanded water-soluble inorganic hydrate salt particles with a normally solid additive.

EXAMPLE II

Eighty grams of pentachlorophenol were dissolved in eighty grams of ethyl ether to provide a homogeneous solution. This solution was then added, with slow agitation, to 120 gm. of expanded or puffed sodium tetraborate, which was prepared according to the procedure described in Example I and had a density of about 5 lb./cu. ft. The puffed particles were agitated until substantially all of the ether had evaporated to the atmosphere. The resulting product was homogeneous, free-flowing and noncaking and contained about 40% by weight pentachlorophenol. The product thus obtained was suitable for use as an agent for treating wood against termites and decay.

EXAMPLE III

A 38 gm. quantity of di(hydrogenated tallow)dimethylammonium chloride was dissolved in 68 gm. of ethanol and 2 gm. of a liquid nonionic nonylphenylpolyethylene glycol ether was then added to the solution. The resulting liquid mixture was then added to 360 gm. of expanded or puffed sodium tetraborate contained in a rotating drum. The expanded sodium tetraborate was prepared according to the procedure described in Example I and had a density of about 25 lb./cu. ft. The open drum was rotated until the odor of ethanol was absent. A dry, free-flowing homogeneous product suitable for use as a fabric softener was obtained.

EXAMPLE IV

An 80 gm. quantity of sodium pentachlorophenol was dissolved in a solvent consisting of equal parts of ether and ethyl alcohol. The resulting solution was added, with stirring to 120 gm. of puffed sodium tetraborate, which had been prepared according to the procedure described in Example I. The mixture was then air dried to provide a product containing about 40% by weight sodium pentachlorophenol.

EXAMPLE V

A measured quantity of a solid cationic primary tallow amine, obtained under the trademark "Alamine 26," was heated till the material was liquified. The liquified additive was then mixed with a quantity of expanded sodium tetraborate, prepared in the manner described in Example I. The liquified additive was readily loaded on the porous expanded particles to give a dry, homogeneous, free-flowing product containing about 50% by weight of the primary tallow amine additive.

As indicated hereinabove, the expanded particles of this invention are suitable for use as carriers for normal solids and normal gases in the detergent industry, drycleaning industry, chemical industry and elsewhere. More specifically, these particles comprise dry-appearing particulate products suitable for use as diaper rinses, fabric softeners, brighteners, bubble bath additives, industrial hand soaps, low-foam laundry products, dry algaecides, salt water detergents, dairy cleaners, wood treating compounds (high solubility), filter aids for organics, cryogenic insulation, foaming agents for plastics, household rug cleaners, bulking and fireproofing agents for cellulose fiber insulation, and the like.

While the invention has been described in accordance with what, at present, are believed to be preferred embodiments thereof, it will be understood, of course, that certain changes, substitutions, modifications and the like may be made therein without departing from its scope.

What is claimed is:

1. The process which comprises providing a quantity of porous, expanded, water-soluble, inorganic hydrate salt particles and intimately contacting said particles with at least one additive material selected from the group consisting of liquefied solid materials and gaseous materials in which the particles have low solubility to provide a quantity of substantially dry, homogeneous, free-flowing particles carrying said additive material and no undesirable reaction occurs between the porous expanded particles and the additive material.

2. The process as defined in claim 1 in which said liquefied solid material is provided by dissolving the solid additive in an inert volatile solvent selected from the group consisting of volatile alcohols, ethers, ketones and mixtures thereof and in which the solvent is evaporated after the particles have been contacted with the liquefied solid material.

3. The process as defined in claim 1 in which said liquefied solid material is provided by heating the solid additive until it is liquefied.

4. The process as defined in claim 1 in which said normally gaseous additive is a material selected from the group consisting of trichloroethylene, acrylonitrile, acetonitrile, trichloromethyl silane, ethyl iodide, propylamine, dimethylpentane, 1-bromopropane, carbon tetrachloride, cyclohexane, and benzene.

5. The process as defined in claim 1 in which said porous, expanded particles consisting essentially of sodium tetraborate.

6. The process as defined in claim 3 in which said mass of a mass of porous, expanded, water-soluble inorganic ing said mass of particles with said liquified additive.

7. A fabric softening composition consisting essentially of a mass of porous, expanded, water-soluble inorganic hydrate salt particles loaded with di(hydrogenated tallow) dimethyl ammonium chloride in an amount up to about two-thirds the volume of said expanded particles.

References Cited

UNITED STATES PATENTS

| 1,813,478 | 7/1931 | Andrussow et al. |
| 3,356,526 | 12/1967 | Waldman et al. ___ 252—8.8 XR |

FOREIGN PATENTS

| 330,453 | 4/1929 | Great Britain. |

OTHER REFERENCES

Technical Bulletin, "Vermiculite, Chemical and Physical Properties," Chicago, Ill., Zonolite Company, 1954, pp. 5 and 9.

MAYER WEINBLATT, Primary Examiner

U.S. Cl. X.R.

8—142; 117—100; 252—182, 184, 383, 385

UNITED STATES PATENT OFFICE
CERTIFICATE OF CORRECTION

Patent No. 3,533,942　　　　　　　　Dated October 13, 1970

Inventor(s) Raymond C. Rhees et al.

It is certified that error appears in the above-identified patent and that said Letters Patent are hereby corrected as shown below:

In the heading to the printed specification, lines 3 and 4, "PROCESS FOR LOADING EXPANDED WATER-SOLUTION HYDRATE SALT PARTICLES" should read -- PROCESS FOR LOADING EXPANDED WATER-SOLUBLE HYDRATE SALT PARTICLES --.

Signed and sealed this 7th day of December 1971.

(SEAL)
Attest:

EDWARD M. FLETCHER, JR.　　　　　　ROBERT GOTTSCHALK
Attesting Officer　　　　　　　　　Acting Commissioner of Patents

UNITED STATES PATENT OFFICE
CERTIFICATE OF CORRECTION

Patent No. 3,533,942      Dated October 13, 1970

Inventor(s)    Raymond C. Rhees et al.

It is certified that error appears in the above-identified patent and that said Letters Patent are hereby corrected as shown below:

Column 3, Table I, line 29, "Ammoniu ferrocyanide" should read -- Ammonium ferrocyanide --; line 49, "Iridiumtribromide" should read -- Iridium tribromide --; line 64, $K_2HAsO_4 \cdot H_2O$" should read -- $K_2HAsO_4 \cdot H_2O$ --. Column 6, line 26, "Sodium-2-ethylhexyl polyphosphate" should read -- Sodium, 2-Ethylhexyl polyphosphate --. Column 10, "Claim 6." should appear as shown below:

6. The process as defined in claim 3 in which said mass of porous, expanded particles is heated prior to contacting said mass of particles with said liquified additive.

Signed and sealed this 29th day of February 1972.

(SEAL)
Attest:

EDWARD M. FLETCHER, JR.
Attesting Officer

ROBERT GOTTSCHALK
Commissioner of Patents